US 7,945,126 B2

(12) United States Patent
Meisner et al.

(10) Patent No.: US 7,945,126 B2
(45) Date of Patent: May 17, 2011

(54) AUTOMATIC MEDIA EDIT INSPECTOR

(75) Inventors: Douglas E. Meisner, Minneapolis, MN (US); Bruce J. Lindbloom, Eden Prairie, MN (US); Michael Greenhalgh, Shakopee, MN (US)

(73) Assignee: Corel Corporation, Ottawa (CA)

( * ) Notice: Subject to any disclaimer, the term of this patent is extended or adjusted under 35 U.S.C. 154(b) by 1159 days.

(21) Appl. No.: 11/611,073

(22) Filed: Dec. 14, 2006

(65) Prior Publication Data

US 2008/0144956 A1   Jun. 19, 2008

(51) Int. Cl.
*G06K 9/03* (2006.01)
*G06K 9/40* (2006.01)
*G06K 15/02* (2006.01)
*G06F 17/00* (2006.01)

(52) U.S. Cl. ......... 382/311; 382/255; 345/418; 358/1.2
(58) Field of Classification Search .................. 382/255, 382/274, 275, 305, 312, 311; 455/134, 226.2, 455/567; 345/418, 428, 611, 617, 620, 660; 358/1.2, 2.1, 3.27, 518, 520, 521, 527, 532

See application file for complete search history.

(56) References Cited

U.S. PATENT DOCUMENTS

| | | | | |
|---|---|---|---|---|
| 6,160,923 | A * | 12/2000 | Lawton et al. | 382/275 |
| 6,693,962 | B1 * | 2/2004 | Murching et al. | 375/240.11 |
| 7,016,531 | B1 * | 3/2006 | Murching et al. | 382/164 |
| 7,221,948 | B2 * | 5/2007 | Tokkonen | 455/456.3 |
| 7,412,263 | B2 * | 8/2008 | Seier | 455/567 |
| 2006/0069742 | A1 * | 3/2006 | Segre | 709/217 |

OTHER PUBLICATIONS

The Luminous Landscape (website) Tutorials: "Expose (to the) Right," Copyright 1995-2006 Michael Reichmann, 6 pages, Retrieved from website on Nov. 3, 2006 using Internet <URL: http://www.luminous-landscape.com/tutorials/expose-right.shtml, The Luminous Landscape, Inc., Toronto, Ontario, Canada.
Canon Consumer Products (Home page), Specifications for Digital Rebel XT, Copyright 2006 Canon U.S.A., Inc., 4 pages, Retrieved from website on Oct. 30, 2006 using internet <URL: http:/www.usa.canon.com/consumer/controller?act=ModelTechSpecsAct&fcategoryid=139&modelid=11154, Lake Success, New York.
DIGITALCAMERAINFO.COM, Digital Camera Reviews: Canon EOS 5D Digital Camera Review, Copyright 2006 DigitalCameraInfo.com, 5 pages, Retrieved from website on Oct. 30, 2006 using internet <URL:http://www.digitalcamerainfo.com/content/Canon-EOS-5D-Digital-Camera-Review/Modes.htm, U.S.A.
HP Labs Research, Printing & Imaging Research Center, "Automatic Redeye Reduction," © 2006 Hewlett-Packard Development Company, L.P., 3 pages, Retrieved from website on Oct. 30, 2006, using Internet <URL: http://www.hpl.hp.com/research/isl/redeye/index.html, Palo Alto, California.

(Continued)

*Primary Examiner* — Kanji Patel
(74) *Attorney, Agent, or Firm* — The Law Offices of Michael E. Kondoudis (57) ABSTRACT

A system that provides automatic background analysis of a digital image or other media element makes a determination that the image or media element may benefit from correction, and prompts the user to use a correction feature of the system. In some implementations, the prompt itself can navigate the user to the controls for the correction feature. Accordingly, users are notified when they might benefit from correction, and they can be further led to discover a feature with which they may have previously been unfamiliar.

19 Claims, 8 Drawing Sheets

OTHER PUBLICATIONS

Letsgodigital online magazine, Peters, Mark, "Red Eye Reduction Technology," Sep. 25, 2006, 4 pages, Retrieved from website on Oct. 31, 2006, using Internet <URL: http://www.letsgodigital.org/en/10465/redeye_reduction_technology/, The Netherlands.

Digital Photography Review (dpreview.com) online magazine, Joinson, Simon, Apr. 2005, Nikon Coolpix 7900 Review, Copyright 1998-2006 Digital Photography Review, 4 pages, Retrieved from website on Oct. 31, 2006, using internet <URL: http://www.dpreview.com/reviews/nikoncp7900/, Askey.Net Consulting Ltd., England and Wales.

Adobe.com: Products—Photoshop Elements 5.0 for Windows, Copyright 2006 Adobe Systems Incorporated, 7 pages, Retreived from website on Oct. 30, 2006, using Internet <URL: http://www.adobe.com/products/Photoshopelwin/overview2.html, San Jose, California.

The imagining resource digital photography newsletter website, vol. 6, No. 8, Apr. 16, 2004, Nikon D70 Digital Camera Review, Retrieved from website on Sep. 29, 2006, using Internet <URL: http://www.imaging-resource.com/PRODS/D70/D70P.HTM, Copyright 2004, The Imaging Resource.

* cited by examiner

AUTOMATIC MEDIA EDIT INSPECTOR

BACKGROUND

Various image editing tools provide an automated correction feature, which may automatically adjust brightness, saturation, focus, contrast, and other image characteristics based on an analysis of the photo. Such correction features allow users to automatically correct color, exposure, and lighting problems in their photos. Unfortunately, for a variety of reasons, a user may not realize that an image might benefit from such correction. Furthermore, from a usability perspective, some users may never even discover such a correction feature within an image editing tool because they do not discern the need for correction. Other operational features (e.g., compression, encryption, reformatting, etc.) of a tool may also escape a user's attention, even when the user could benefit from such features in a particular circumstance.

SUMMARY

Implementations described and claimed herein address the foregoing and other situations by providing a system that performs automatic background analysis of a received digital image (or other media element), making a determination that the image (or media element) may benefit from some operational feature of the system (e.g., a correction feature), and prompting the user to use an operational feature of the system. In some implementations, the prompt itself (e.g., when selected) can navigate the user to the controls for the operational feature. Accordingly, users are notified when they might benefit from the operational feature, and they can be further led to discover a feature with which they may have previously been unfamiliar.

This technique can be applied to many other media (e.g., video and audio) and operational features (e.g., compression, encryption, signing, time-stamping). For example, a background analysis may automatically suggest that graphical noise correction might be applied. In another implementation, a background analysis of an audio file may suggest a different form or level of compression for certain songs and certain circumstances. As such, the term "media element" may include without limitation images, other graphical representations, video, audio, etc.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION

Figure 1:
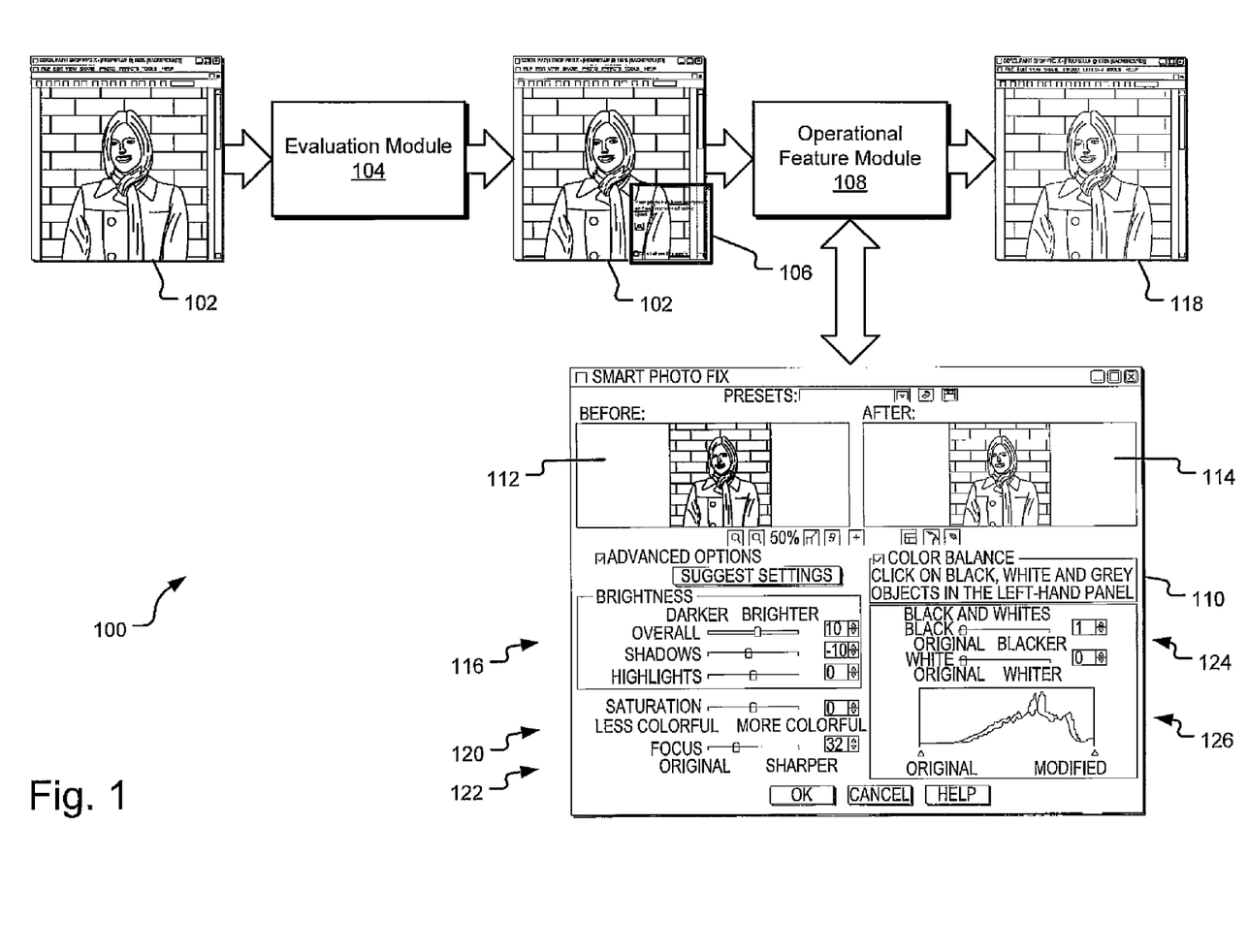
FIG. 1 illustrates an example system for automatically inspecting a digital image.

FIG. 1 illustrates an example system 100 for automatically inspecting a digital image or other media element. An original image 102 is input to an evaluation module 104 of the example system 100. In one implementation, the example system 100 functions as a media application, such as an image editing software application, a video editing software application, an audio editing software application or various media management tools. In the case of an image editing software application, the original image 102 may be input from an image capture or storage device via a wired or wireless connection. Example storage devices may include without limitation local and remote magnetic or optical storage disks, memory storage devices, network attached storage devices, etc. Alternatively, the example system 100 may be implemented as a computing device, such as a digital camera, a desktop, laptop, handheld computer, etc. In a camera implementation, for example, input may be accomplished via an image capture operation, which passes the captured original image 102 to the evaluation module 104, which may be local or remote. It should also be understood that a media application could be executed on a computing device.

The evaluation module 104 determines whether the original image 102 could benefit from automatic correction (or some other operational feature of the system 100). Examples of operational features considered by the evaluation module 104 may include without limitation brightness correction, saturation correction, focus, barrel distortion correction, lens distortion correction, contrast correction, JPEG artifact correction, vignette distortion correction, scratch removal, noise reduction, etc In one implementation, the evaluation module 104 performs an automatic correction to produce a corrected image (not shown). Then, the evaluation module 104 determines differences between the original image 102 and the corrected image. If the differences satisfy an alert criterion, then the user is alerted to the possibility and/or potential benefit of using an operational feature of the system 100 to correct the original image. In one implementation, the user is alerted via a prompt presented on a display to the user suggesting that the user execute a corrective feature of the system 100, although alerts may also include alternative visual prompts, audio prompts, tactile prompts, or some combination thereof. (In FIG. 1, the original image 102 is shown to the right of the evaluation module 104 with a prompt 106, which is shown in more detail in FIG. 2.)

If the user wishes to correct the image, responsive to the prompt, he or she may execute an operational feature module 108 (such as correction module) by selecting a menu item or other control within the user interface of the system 100. Alternatively, the prompt itself may provide a control to allow the user to navigate to or execute the operational feature module 108 of the system 100. It should be understood that the operational feature module 108 may allow the user to influence or approve the operational parameters of the feature. For example, the user may adjust suggested parameters of the correction. Alternatively, the system 100 may automatically execute an operational feature on the original image 102, once the feature is selected by the user. The system 100 may also provide an "undo" feature to allow the user to reverse the correction if he or she does not approve of the results. It should also be understood that the operational feature module 108 may incorporate multiple operational features, such as auto sharpening and auto saturation correction.

In the illustrated implementation, a dialog box 110 for a "Smart Photo Fix" is shown as an example of a correction feature, one in which the user is presented with suggested settings of a correction operation. A scaled down version 112 of the original image 102 is shown to the left, and a scaled down version 114 of a corrected image 118, providing a representation what the image would look like after correction, is shown to the right. Although it may not be apparent in FIG. 1, the original image 102 is noticeably darker than an image resulting from the correction (i.e., the corrected image 118).

Controls 116 show proposed settings for altering brightness in the original image 102. In one implementation, these controls can be altered by the user, although in another implementation, these controls may be locked to the user. A control 120 shows a proposed setting for altering the saturation of the original image 102, and a control 122 shows a proposed setting for altering the focus (i.e., sharpness) of the original image 102. Controls 124 show proposed settings for amplifying the blackness and the whiteness of the original image 102, with the per-pixel distribution of shadows, mid-tones, and highlights in both the original image 102 and the representation 114 of the corrected image being shown in the histogram 126. In the illustrated implementation, whether the user adjusts the proposed settings or not, the user can select the OK button to apply the correction represented by the control settings to generate the corrected image 118. It should be understood that the proposed control settings may used as feature vector elements, which are discussed with regard to FIGS. 3 and 5.

Figure 2:
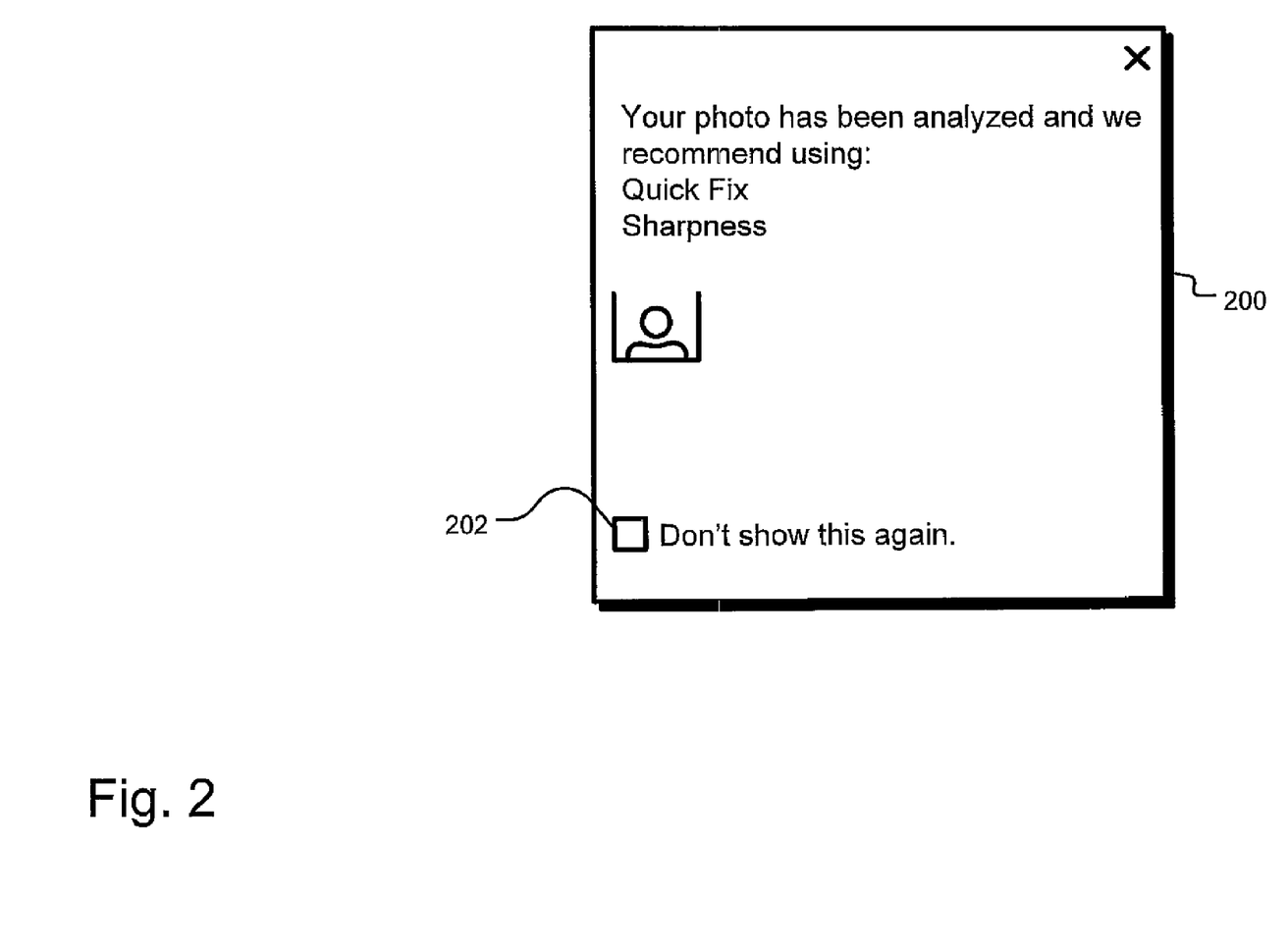
FIG. 2 illustrates an example alert associated with automatic inspection of a digital image.

FIG. 2 illustrates an example alert 200 associated with automatic inspection of a digital image. The alert 200 is displayed in association with an inspected image to suggest that the image may benefit from operational features called "Quick Fix" and "Sharpness". In one implementation, it is incumbent upon the user to locate the Quick Fix feature within the media application in response to seeing the alert 200, if he or she wishes to correct the image. In an alternative implementation, the alert contains a one or more links or other navigation controls that will invoke the correction feature upon selection by the user. For example, the words "Quick Fix" in the alert 200 can be presented in the form of a link that invokes an auto correction feature of the system.

The illustrated alert 200 is rendered as a translucent overlay in front of the associated image, although other alert forms may be employed including blinking lights in the user interface, audible sounds, dialogue balloons (as one might see in a comic book), banners, animated (e.g., blinking or moving) controls, etc. Generally, the alert 200 is intended to attract the user's attention and prompt the user to use an operational feature of the system. Such prompting can educate the user to understand new or previously unknown or underused features of the system. Furthermore, the results of using this feature can also increase the user's satisfaction with the product. Note: the alert could also prompt the user to use a feature of some related product. In one implementation, an overlay alert or some other form of alert is displayed with reference to the image needing correction, such as overlaying the image, pointing toward the image, sharing an identifier with the image, etc.

It should also be understood that an alert may prompt the user to use multiple features of the system. For example, an alert may prompt the user to use an auto correct feature that corrects brightness, saturation, and focus, and also prompt the user to use a red-eye correction feature to remove instances of red-eye. The checkbox 202 may be used to turn off all alerts or may be used to selectively terminate subsequent alerts for the current feature (e.g., "Quick Fix)".

The alert may also be associated with a setting (e.g., within the alert itself, in a configuration file, in a registry, etc.) that allows the user to specify that the system should always or never execute a proposed operational feature when a corresponding alert criterion is satisfied. For example, the user may set the system to always automatically execute a sharpen feature without a prompt, but never automatically execute an exposure correction feature without a prompt.

Figure 3:
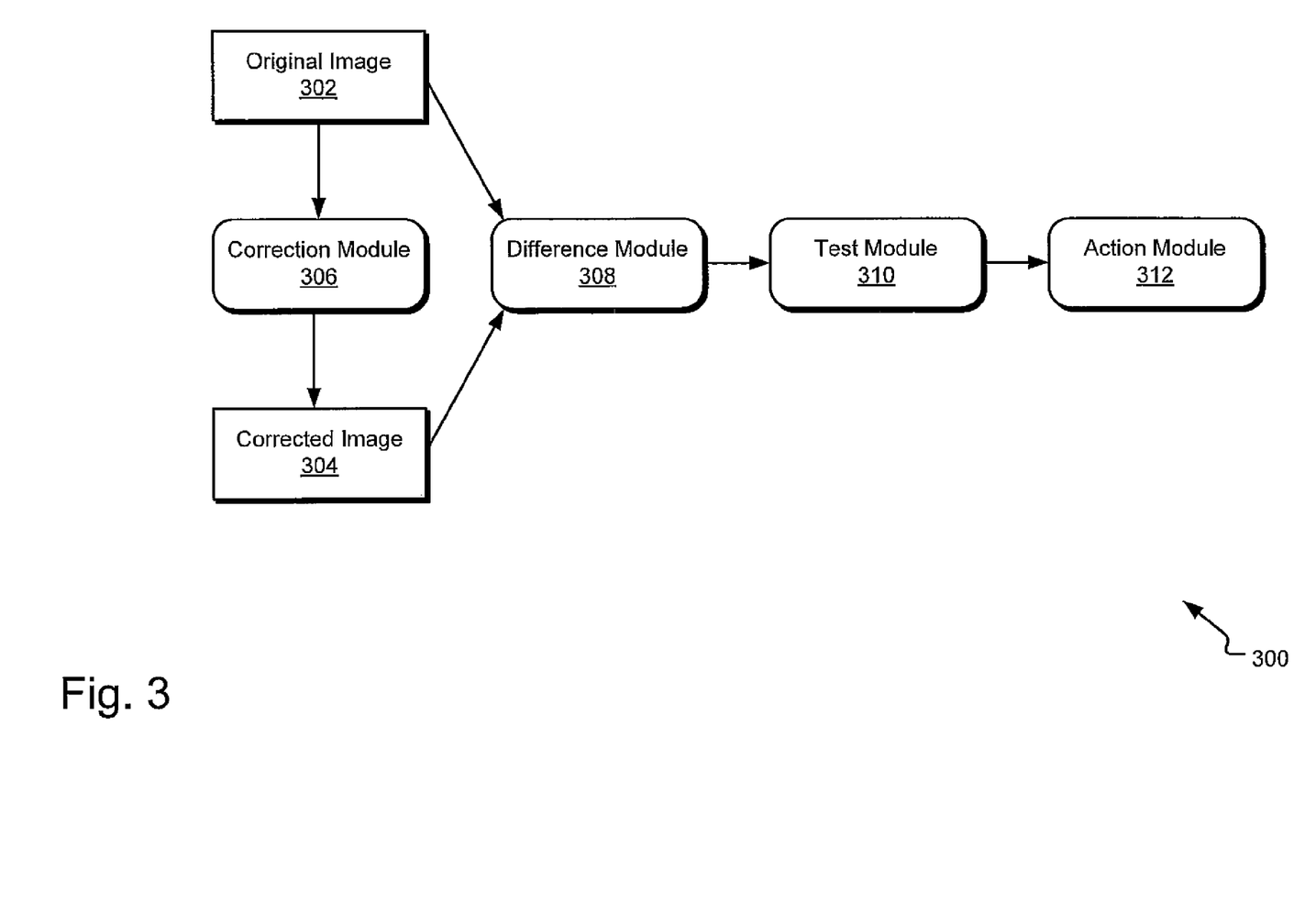
FIG. 3 illustrates an example system flow for automatically inspecting a digital image using differences between an original image and a corrected image.

FIG. 3 illustrates an example system flow 300 for automatically inspecting a digital image using differences between an original image 302 and a corrected image 304. The original image 302 is input to a correction module 306. For example, the original image 302 may be opened in an image editing software application. As the original image 302 is being processed and displayed in the image editing software application's user interface, the correction module 306 performs a correction on the original image 302 to generate the corrected image (which need not be displayed). For example, an automatic brightness correction operation may be performed by the correction module 306 on the original image 302 to generate the potentially brighter corrected image 304.

The original image 302 and the corrected image 304 are input to a difference module 308, which computes a feature vector representing one or more differences between the original image 302 and the corrected image 304. In one implementation, difference module 308 evaluates the two images in one or more different color spaces (e.g., CIELAB or L*a*b*, CIELUV or L*u*v*, CIExyY, CIEXYZ, CMY, CMYK, HLS, HSI, HSV, HVC, LCC, NCS, PhotoYCC, RGB, Y'CbCr, Y'IQ, Y'PbPr, Y'UV, etc.) in an attempt to quantify at least one measure of difference between the images. In an alternative implementation, feature vector elements resulting from the difference module 308 can represent control setting differences or other perceptible differences. For example, instead of computing pixel-by-pixel differences, the difference module 308 can insert control adjustments suggested in the correction dialog box (see controls 116, 120, 122, and 124 of FIG. 1) into the feature vector.

One type of difference computation that may be employed is based on a Delta E methodology, which is also referred to as a perceptual or visual color difference. Generally, a Delta E value may be computed by determining the difference, on a pixel-by-pixel basis between the measured color value, $L*_o a*_o b*_o$, of a pixel in the original image 302 and the measured color value, $L*_c a*_c b*_c$, of the corresponding pixel in the corrected image 304. In one implementation, the Delta E methodology first involves a transform of the color values of each pair of pixels from the RGB color space to the L*a*b*, color space. Note: the L*a*b* color space is considered a perceptually-based color space, whereas RGB is not.

Various methods exist for computing Delta E, including Delta E (CMC), Delta E (CIE 1976), Delta E (CIE 1994), Delta E (CIE 2000) and a variety of other methods. Furthermore, other differences may be employed, including differences in lightness ($L*_o*-L*_c$) and color differences computed in any color space. It is recognized that each color space may have a unique nature (e.g., perceptually-based, quasi-perceptually-based, not perceptually-based, linear energy-based, etc.) and set of characteristics.

In one implementation, having determined a difference value ($\Delta_i$, where i represents an index 1-N associated with individual pixel pairs in the images, e.g., $\Delta_1$ represents the difference between a first pixel from the original image and the corresponding pixel of the corrected image, $\Delta_2$ represents the difference between a second pixel from the original image and the corresponding pixel of the corrected image, . . . ) for each pixel pair in the images, the difference module 308 determines a root-mean-square (RMS) value of the differences:

$$\Delta_{RMS} = \sqrt{\frac{\Delta_1^2 + \Delta_2^2 + \Delta_3^2 + \ldots + \Delta_N^2}{N}} \quad (2)$$

and a maximum value of the differences:

$$\Delta_{MAX} = \max(\Delta_1, \Delta_2, \Delta_3, \ldots, \Delta_N) \quad (3)$$

Figure 4:
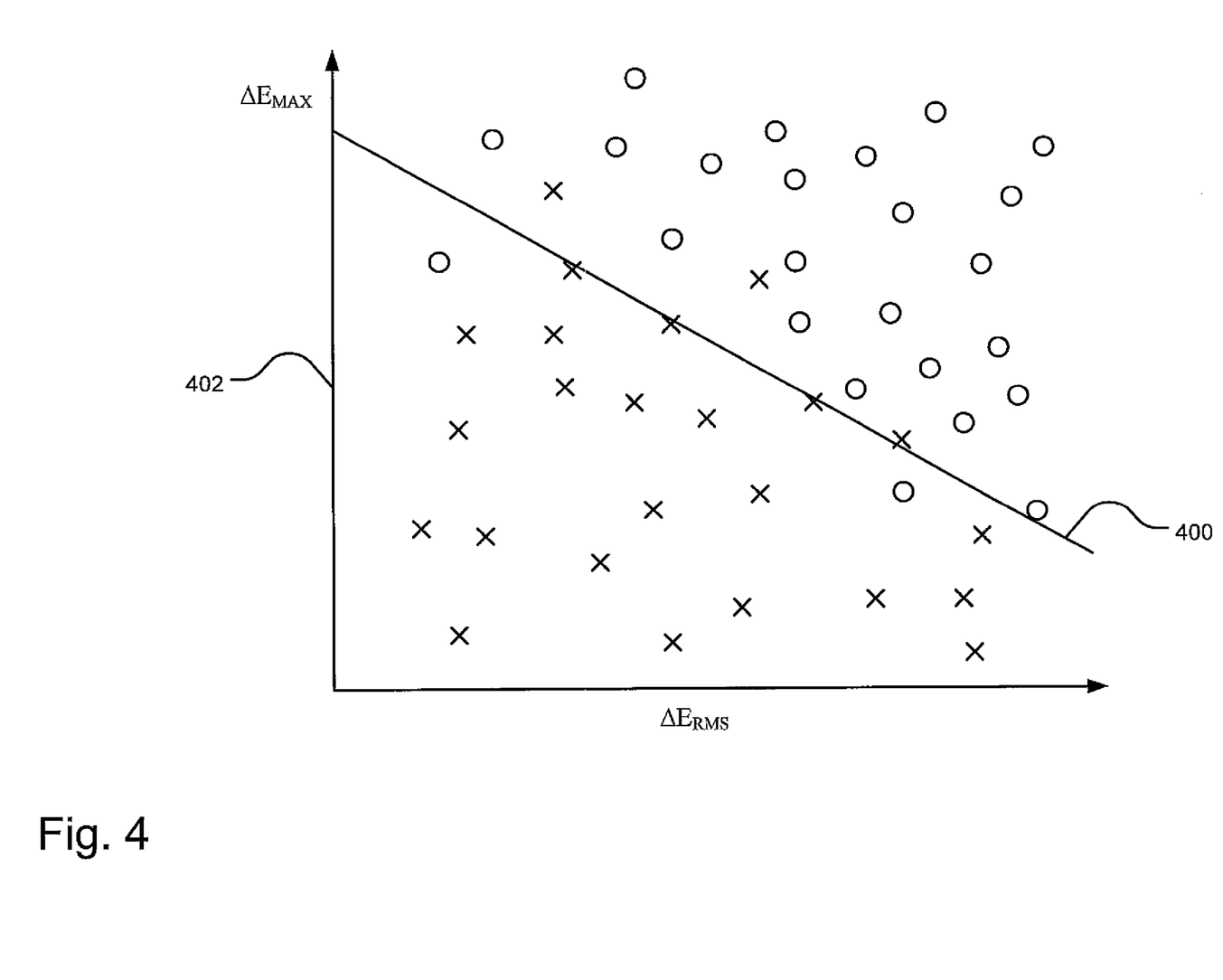
FIG. 4 illustrates a threshold applicable to differences between an original image and a corrected image.

The computed values are output as a feature vector and input by a test module 310, which determines whether the feature vector satisfies an alert criterion (see the discussion regarding FIG. 4). If the test module 310 determines that the feature vector satisfies the alert criterion, an action module 312 executes operations to alert the user of potential benefit from a feature of the system (e.g., an auto correct feature, an auto noise reduction feature, an auto sharpening feature, etc.). In one implementation, the action module 312 prompts the user to use a Quick Fix feature of an image editing software application, although other actions are contemplated. Via the action module 312, the user may also execute the selected operational feature, as prompted by the alert, to generate the corrected image.

FIG. 4 illustrates a threshold 400 applicable to differences between an original image and a corrected image. In one implementation, the threshold 400 represents an alert criterion and is preset within the system according to comparisons of a test set of original images and corrected images. For example, a group of one or more experienced photographers or image experts may be surveyed over the test set of image pairs and asked to select those image pairs that benefited from application of an operational feature (e.g., auto correct) of the system. When the feature vectors are plotted on a graph 402, it can be seen that the surveyed individuals identified certain images as benefiting from the operational feature (e.g., the circles) and others as not benefiting from the feature (e.g., the crosses). To determine the threshold 400, a line is fit between the circles and the crosses using a fitting algorithm. It should be understood, however, that other alert criteria may be applied in alternative implementations, including 2-dimensional "thresholds" in a 3-dimensional feature space, etc. During the execution of the test module of FIG. 3, if a pair of images result in a feature vector that satisfies the alert criterion (e.g., lies above the threshold 400), the test module triggers the action module to alert the user and possibly perform other operations.

It should be understood that individual thresholds may be associated with individual features. As such, the threshold applied to saturation-related elements of the feature vector may be different from the threshold applied to brightness-related elements of the feature vector. Accordingly, it is possible for a system to have individual thresholds for all of the operational features it provides.

In another implementation, a threshold may be set or adjusted by the user. For example, a user may wish to be prompted more or less frequently—more frequently may be desirable as the user is first learning how to use the system, whereas less frequently may be desirable as the user tires of the alerts. In addition, the threshold may also be dynamically controlled by a feature's pattern of use, wherein the patterns of use by a user may be stored in a database accessible by the application. For example, if the feature is seldom used, the threshold may be lowered to increase the probability that an alert may be triggered, thereby guiding the user to an infrequently used operational feature from which they may benefit. In this manner, the system "senses" a level of comfort or familiarity the user already has with the operational feature and adjusts the alerts accordingly.

In yet another implementation, the threshold may also be dynamically controlled by a pattern of response by the user to one or more operational feature prompts, wherein the patterns of response by a user may be stored in a database accessible by the application. For example, if the user frequently rejects the prompt to try a specified operational feature, then the associated alert criterion may be altered to make it appear less frequently. In this manner, the system "senses" a level of sensitivity the user has for the detected corrections and adjusts the alerts accordingly. It should also be understood that automatically-adjusted thresholds may be managed individually for different alerts.

In yet another implementation, the alert criteria can be adjusted over time by the vendor of the media application. For example, the vendor can monitor user responses to prompts (e.g., via usability testing, surveys, whether or not network-based, and/or test groups) after release of the media application and send updates of alert criteria to the media application (e.g., via patch mechanism) to adjust the alert criteria in the media application.

Figure 5:
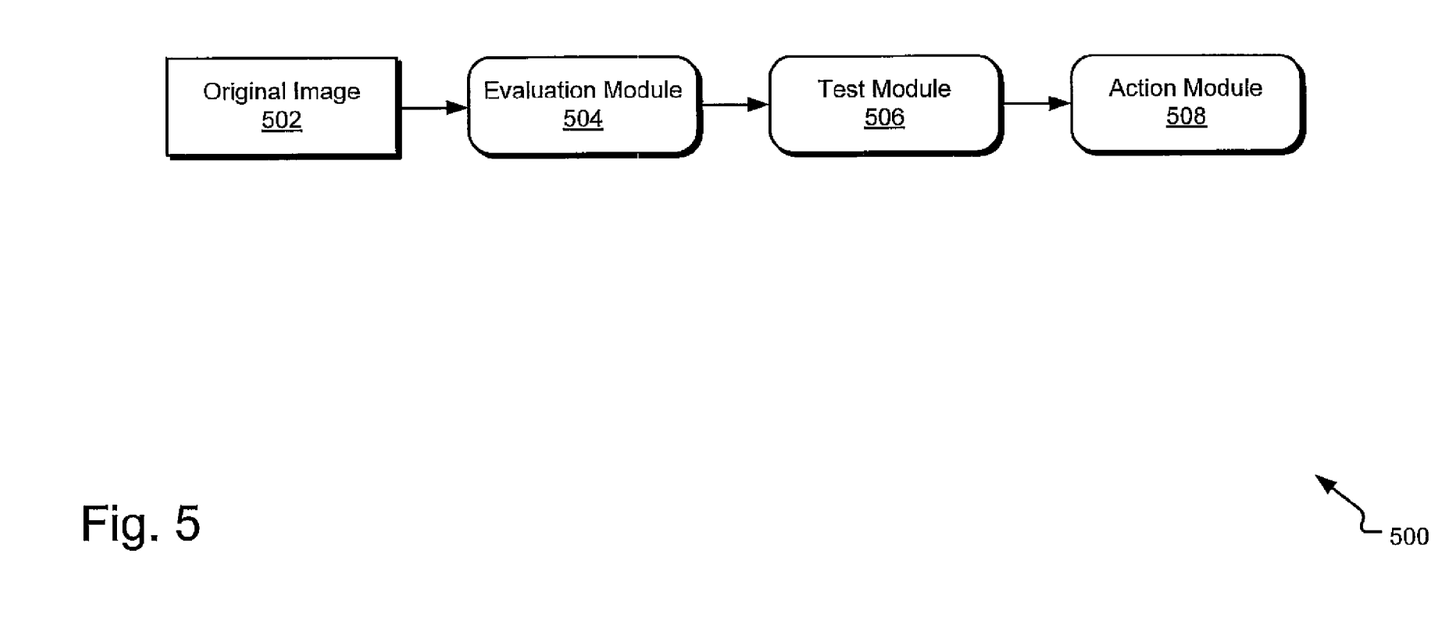
FIG. 5 illustrates an example system flow for automatically inspecting a digital image using evaluation of the original image.

FIG. 5 illustrates an example system flow 500 for automatically inspecting a digital image using evaluation of an original image 502. In contrast to the example system flow of FIG. 3, in FIG. 5, the inspection does not depend on a corrected image. Instead, the original image 502 is analyzed without reference to a corrected image (although certain other parameters may be employed, such as size and color parameters relating to red-eye detection, etc.).

An evaluation module 504 receives the original image 502 (e.g., reads it from a storage disk or memory) and analyzes the original image 502 for any number of conditions. In one implementation, the evaluation module 504 may attempt to detect red-eye in the image. Other alternatives may include without limitation detection of an image containing text or exhibiting potential problems, such as a barrel distortion, JPEG artifacts, vignetting, lens distortion, scratches, noise, etc. For example, based on red-eye parameters and a red-eye detection algorithm, the evaluation module 504 may output in a feature vector a computed probability that the image contains one or more instances of red-eye. A test module 506 can then compare the probability (which roughly represents the expectation that the user may benefit from use of an appropriate operational feature) to an alert criterion (e.g., a probability threshold) associated with that feature. If the test module 506 determines that the computed probability satisfies the alert criterion, then an action module 508 prompts the user to use a red-eye correction feature in the system. The action module 508 may also display the computed probability to the user.

An evaluation module 504 may also attempt to detect text in the original image 502. Accordingly, in an example of text analysis, the evaluation module 504 may compute a probability that text may exist in the original image 502 and pass this probability to the test module 506, which compares the computed probability to an alert criterion. If the test module 506 determines that the computed probability satisfies the alert criterion, then an action module 508 prompts the user to use an auto tagging feature in the system, which reads text from the original image 502 and tags the original image file with the extracted text.

In yet another implementation, the evaluation module 504 may analyze the original image 502 relative to an intended purpose. For example, if original image 502 is being opened for inclusion in an email document, the evaluation module 504 may determine the size, format, and/or other characteristics of the image file and include them in a feature vector, which is passed to the test module 506. Then, the test module 506 can compare these characteristics of the image to some requirements of the email system to determine, for example, whether the image is too large for such inclusion (relative to some security policy or support in common email applications), is in the wrong format (relative to some security policy), etc.

Three specific example implementations are described herein (straightening, red-eye correction, and contrast correction), although it should be understood that other specific characteristics and operational features are contemplated for alerts in other implementations.

With regard to straightening, the Hough transform may be used to obtain a probability distribution of the presents of lines at varying angles in the image. The feature vector resulting from this analysis may contain a signal strength (e.g., probability) distribution of lines at 0 and 90 degrees, as well as a signal strength distribution of lines in the near vertical and near horizontal orientations (e.g., $-5° \leq x \leq 5°$, $85° \leq x \leq 95°$, where x is the sampled signal strengths in each orientation category). The decision about whether to prompt the user to use a straightening feature of the tool may be determined as follows:

(a) if the near-horizontal/vertical orientations signal strengths are sufficiently strong, AND (b) if the near-horizontal/vertical orientations signal strengths exceed the horizontal/vertical signal strengths by a sufficient margin, THEN prompt the user to use the straightening tool.

With regard to red-eye correction, various metrics may be used to determine the probability that an image has red-eye:

(a) was a flash used (e.g., as may be determined from EXIF (Exchangeable Image File format) information)?

(b) are there regions of the image in which color lies within a prescribed tolerance (e.g., with a hue range, saturation range, and lightness range associated with red-eye)?

(c) are the sizes of such regions within a prescribed tolerance?

(d) are the shapes of such regions within a prescribed tolerance?

Any of these factors may be employed, as well as others, in any combination to judge the probability that an undesirable red-eye defect exists within the image. The feature vector may contain metrics associated with any such factors, may contain an aggregate probability of red-eye, or some additional factors.

Contrast is considered a measure of the tone range found in an image, which may be obtained from an image histogram. As a result of histogram analysis, a feature vector may be generated to contain one or more measures of important tones in the image, such as the 0.5% region of the histogram, 99.5% region of the histogram, and possibly other tonal regions of the histogram to determine whether the image could benefit from histogram modification (e.g., stretching) to correct the contrast.

In yet another implementation, EXIF data, which can specify a variety of camera settings, context parameters, location information, formatting parameters, etc. (collectively, "image metadata elements"), may be more fully used in selection, setting, or comparison against an alert criterion. EXIF data associated with an image may specify the type of camera, the type of lens, the time of day, the date, f-stop setting, film speed, the latitude/longitude, etc., and the alert criteria selected for use with the image may be customized based on such data. For example, a noise alert criterion may be omitted or adjusted if a camera having image stabilization was used to capture the image, a sharpening alert criterion can be omitted or adjusted if the f-stop setting is small, resulting in a small depth of field, so as not to suggest sharpening in the presence of an intentionally blurry background, etc.

Figure 6:
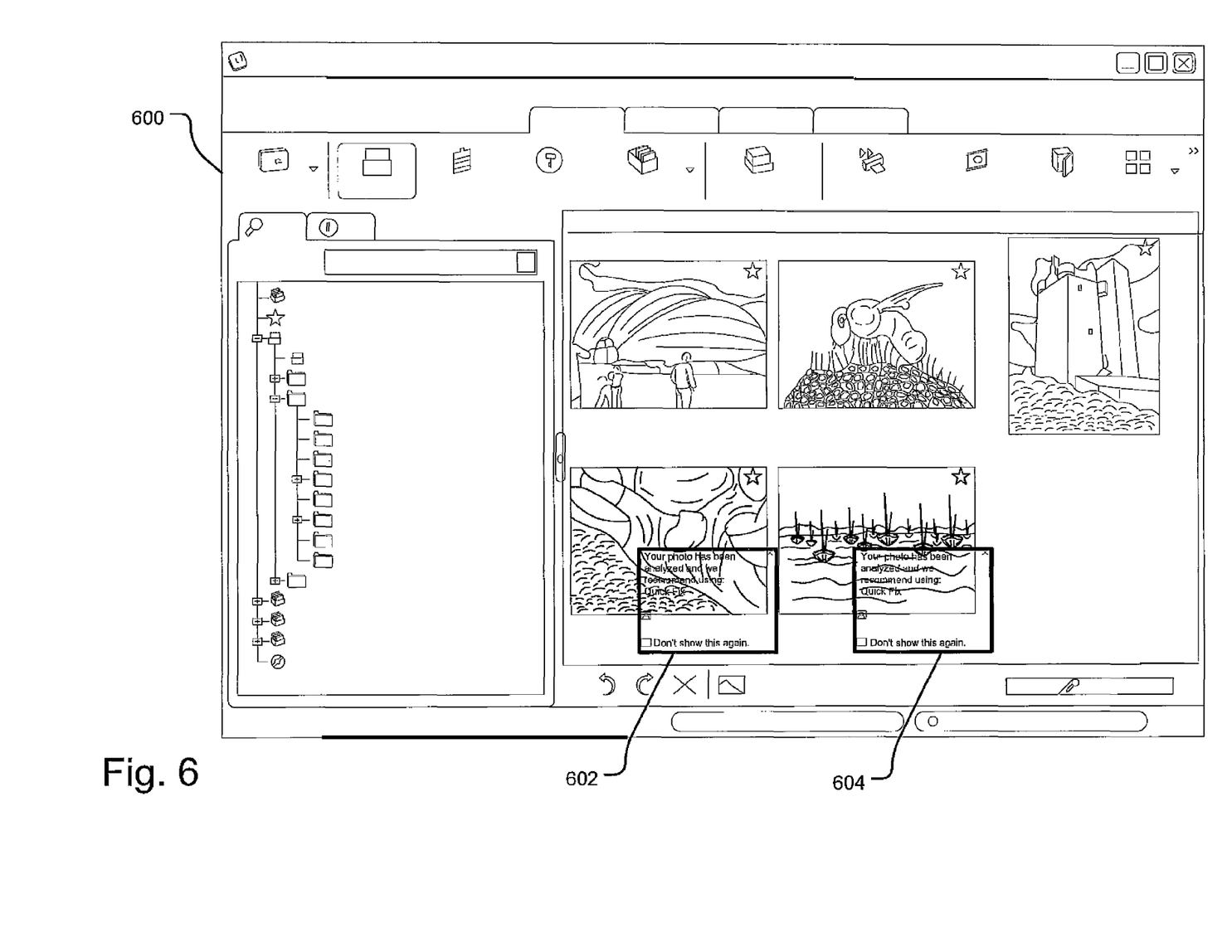
FIG. 6 illustrates an example screenshot for applying automatic inspection of multiple digital images.

FIG. 6 illustrates an example screenshot 600 for applying automatic inspection of multiple digital images. In at least one survey, 30% of digital images input to an automatic inspection tool were deemed to be able to benefit substantially from an auto correction operation. The screenshot 600 represents a user interface of a photo album software application for managing multiple digital images. In one implementation, as each digital image is input to the photo album software, it is evaluated, such as described with regard to FIGS. 3 and 5, and an alert is displayed if the feature vector resulting from the evaluation satisfies an alert criterion. Example alerts are shown in FIG. 6 as alerts 602 and 604, which prompt the user that use of one or more features of the photo album software application (or some related software application or device) may improve the corresponding image. Note: The alert prompting use of a related software application or device may provide an avenue to cross-sell a related product. For example, the user may be executing an image management tool, such as the photo album software application, and the alert may prompt the user to purchase a related image editing tool. The image management tool may even provide access to a trial version of the image editing tool through the alert. Results of the multiple image inspection may also be presented as an on-screen table of alerts for each image.

Figure 7:
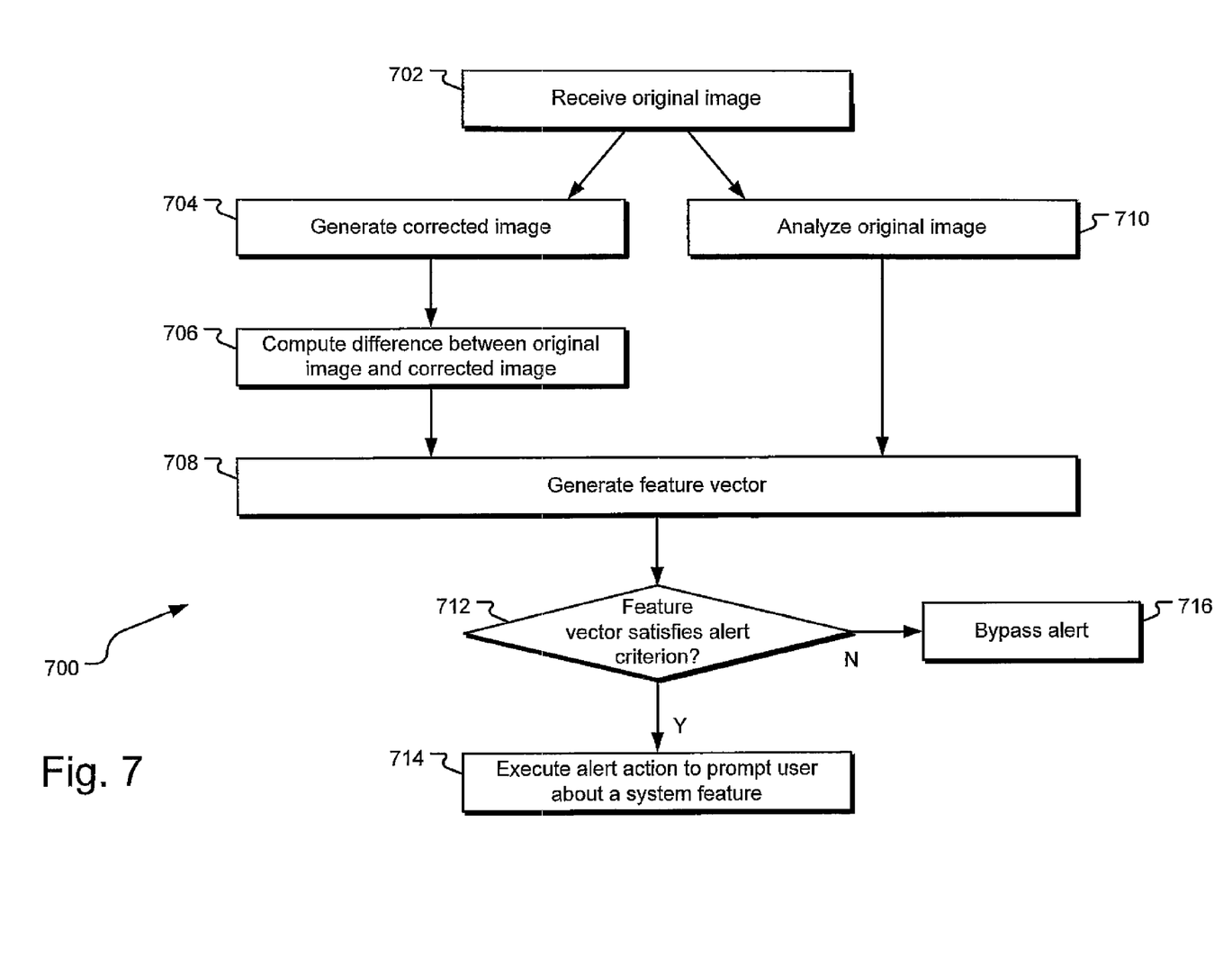
FIG. 7 illustrates example operations for automatically inspecting a digital image.

FIG. 7 illustrates example operations 700 for automatically inspecting a digital image. A receiving operation 702 receives an original image into the system, such as by receiving the original image from a camera via a communications link, by capturing the original image in a camera, or by reading the original image from memory or a storage disk. For example, in one implementation, the image is read from a file in a file system of a computing device. Example systems may include a software application executing on a computing device, a camera, a mobile phone, etc. It should be understood that other media, such as video and audio, may benefit from a similar process.

A generation operation 704 generates a corrected image via one or more correction features of the system. For example, the generation operation 704 may execute a contrast correction feature or some other feature to generate a corrected image. It should also be understood that the generation operation 704 could execute multiple correction features, including without limitation an auto sharpening feature, an auto correct feature, a noise reduction feature, a color balance feature, etc. Generally, these correction features represent types of operational features of the system.

A difference operation 706 computes a difference between the original image and the corrected image. Methodologies discussed herein and other difference computations may be employed by the difference operation 706. The difference operation 706 generates difference parameters, which may be included in a feature vector associated with the original image. The difference parameters may include values such as $\Delta_{RMS}/\Delta_{MAX}$ pairs, control setting adjustments from an operation feature, or other perceptual differences.

In an alternative or parallel flow, an analysis operation 710 may analyze the original image itself, independent of the corrected image. For example, the original image may be analyzed for red-eye, text, distortion, and other characteristics, as also discussed herein. In one implementation, the analysis operation 710 generates a probability parameter for one or more features, and the probability parameters may be included in a feature vector associated with the original image.

A generation operation 708 generates a feature vector containing one or more parameters from the difference operation 706 and/or the analysis operation 710. A decision operation 712 determines whether the feature vector satisfies an alert criterion. It should be understood that the alert criterion may have distinct sub-criteria for individual features. For example, the feature vector may indicate an 85% probability of red-eye existing in the original image and may indicate two specific $\Delta_{RMS}/\Delta_{MAX}$ pairs, one relating to an auto sharpening feature of the system and the other relating to an auto saturation correction feature of the system. In this example, if any of these three feature vector elements satisfies an alert criterion for the corresponding feature, an alert operation 714 prompts the user to use an appropriate operational feature of the system. As a specific example, if an alert criterion for red-eye correction is set at 80% and the threshold for saturation correction is set such that the $\Delta_{RMS}/\Delta_{MAX}$ pair for the saturation differences satisfies the threshold, then the user is prompted to use the red-eye correction feature and the auto saturation correction feature. Otherwise, if no feature vector element satisfies a corresponding alert criterion, then a bypass operation 716 bypasses the alert.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Figure 8:
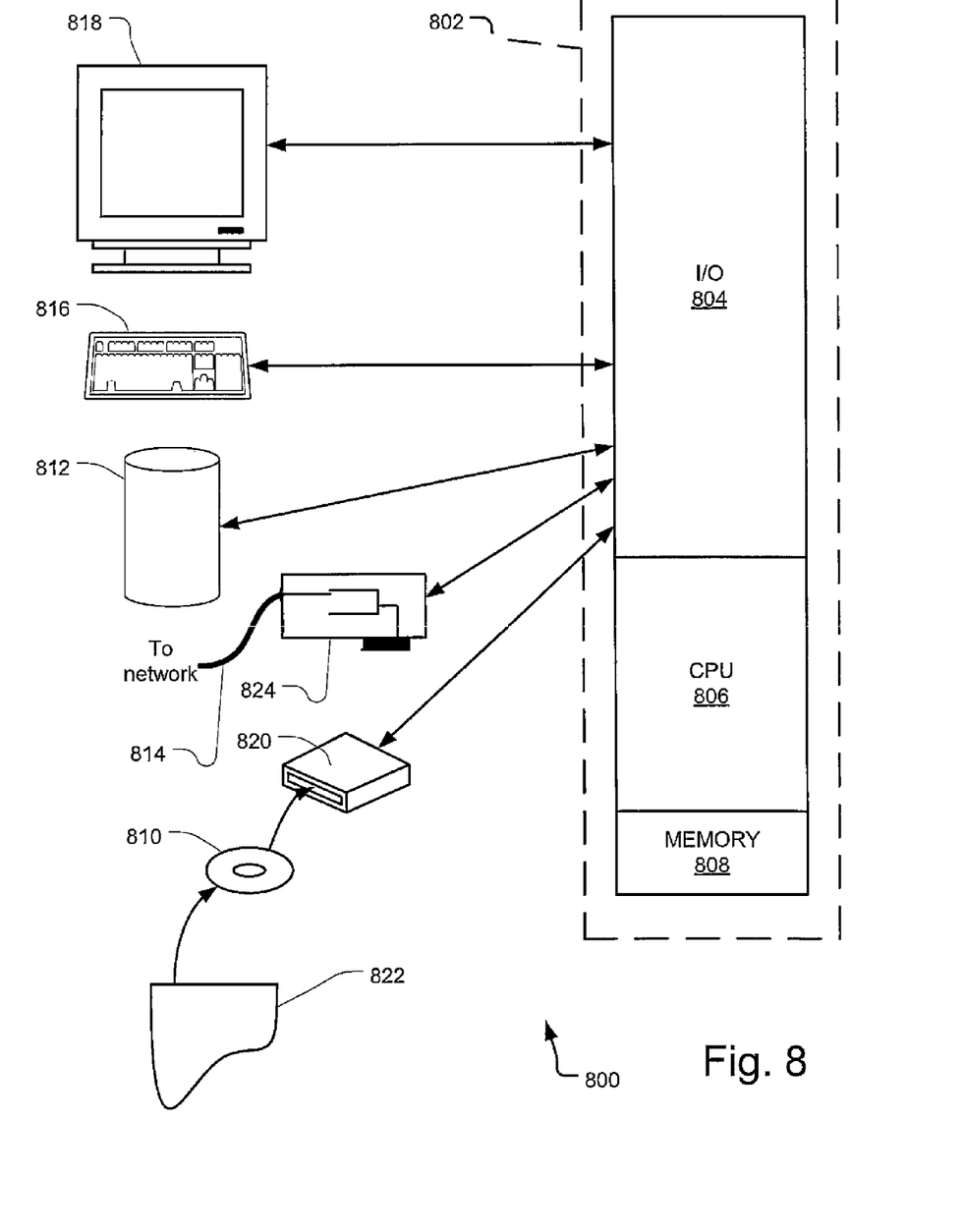
FIG. 8 illustrates a system that may be useful in implementing the described technology.

FIG. 8 illustrates components of an example system that can be useful in the implementation of the described technology. A general purpose computer system 800 is capable of executing a computer program product to execute a computer process. Data and program files may be input to the computer system 800, which reads the files and executes the programs therein. Some of the elements of a general purpose computer system 800 are shown in FIG. 8 wherein a processor 802 is shown having an input/output (I/O) section 804, a Central Processing Unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a distributed computer, or any other type of computer. The described technology is optionally implemented in software devices loaded in memory 808, stored on a configured DVD/CD-ROM 810 or storage unit 812, and/or communicated via a wired or wireless network link 814 on a carrier signal, thereby transforming the computer system 800 in FIG. 8 to a special purpose machine for implementing the described operations.

The I/O section 804 is connected to one or more user-interface devices (e.g., a keyboard 816 and a display unit 818), a storage unit 812 (e.g., a storage disk), and a disk drive unit 820. Generally, in contemporary systems, the disk drive unit 820 is a DVD/CD-ROM drive unit capable of reading the DVD/CD-ROM medium 810, which typically contains programs and data 822. Computer program products containing mechanisms to effectuate the systems and methods in accordance with the described technology may reside in the memory section 804, on a storage unit 812, or on the DVD/CD-ROM medium 810 of such a system 800. Alternatively, a disk drive unit 820 may be replaced or supplemented by a floppy drive unit, a tape drive unit, or other storage medium drive unit. The network adapter 824 is capable of connecting the computer system to a network via the network link 814, through which the computer system can receive instructions and data embodied in a carrier wave. Examples of such systems include personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, digital cameras, gaming consoles, set top boxes, etc.

When used in a LAN-networking environment, the computer system 800 is connected (by wired connection or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are exemplary and other means of and communications devices for establishing a communications link between the computers may be used.

In an exemplary implementation, an evaluation module, a difference module, a correction module, a test module, an action module and other modules may be incorporated as part of the operating system, application programs, or other program modules. Image data, alert criteria, feature vectors, alerts, and other data may be stored as program data.

The technology described herein may be implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification provides a complete description of the methodologies, systems and/or structures and uses thereof in example implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the appropriate scope resides in the claims hereinafter appended. In particular, it should be understood that the described technology may be employed in virtually all, if not indeed all, digital imaging. Other implementations are therefore contemplated. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

What is claimed is:

1. A method comprising:
    receiving one or more original media elements into a computing application in execution upon a computer system;
    analyzing one or more characteristics of the one or more original media elements to generate a feature vector for each original media element, the feature vector including a representation of an analysis result for each of the one or more characteristics; and
    generating and providing an audiovisual prompt to a user of the computer system relating to an operational feature of the computing application when the feature vector satisfies an alert criterion associated with the operational feature.

2. The method of claim 1 wherein the operational feature is a correction feature of the computer application.

3. The method of claim 1 further comprising:
    receiving from the user an input specifying that the operational feature should be automatically executed without a prompt if the alert criterion is satisfied by a feature vector of a subsequently received media element;
    automatically executing the operational feature on the subsequently received media element without a prompt if the feature vector for the subsequently received media element satisfies the alert criterion, responsive to the operation of user input.

4. The method of claim 1 wherein the alert criterion is adjustable by the user.

5. The method of claim 1 wherein the alert criterion is adjustable according to pattern of responses to operational feature prompts by the user.

6. The method of claim 1 wherein the alert criterion is adjustable according to one or more metadata elements being of a predetermined type.

7. The method of claim 1 further comprising:
    maintaining a database within the computer system of previous responses to operational feature prompts by the user;
    adjusting the alert criterion according to the responses stored in the database.

8. The method of claim 1 wherein the alert criterion is adjustable based on data received remotely from a vendor of the computing application.

9. The method of claim 1 wherein the alert criterion is associated with a specific characteristic of the original media element, other alert criteria are associated with other specific characteristics of the original media element, and further comprising:
    prompting the user about one or more other operational features of the computing application, if the feature vector satisfies at least one of the other alert criteria associated with the operational features.

10. The method of claim 1 wherein the prompting operation comprises:
    generating an audible prompt specifying the operation feature.

11. The method of claim 1 wherein the prompting operation comprises:
    displaying an alert specifying the operational feature with reference to the original media element.

12. The method of claim 1 wherein the prompting operation comprises:
    prompting the user about multiple operational features of the computing application simultaneously.

13. The method of claim 1 wherein the prompting operation comprises:
    displaying a probability that a correctable characteristic is present in the original media element.

14. The method of claim 1 wherein the prompting operation comprises:
    prompting the user about the operational feature of the computing application with reference to multiple original media elements simultaneously.

15. The method of claim 1 further comprising:
    executing the operational feature in response to user input;
    providing user access to an undo feature to allow the user to undo the results of the operational feature, responsive to execution operation.

16. One or more non-transitory computer-readable media having computer-executable instructions for performing a computer process on a computer system, the computer process comprising:
    receiving one or more original media elements into a computing application executing on the computer system;
    analyzing one or more characteristics of the one or more original media elements to generate a feature vector for each original media element, the feature vector including a representation of an analysis result for each of the one or more characteristics;
    generating and providing an audiovisual prompt to a user of the computer system relating to an operational feature of the computing application when the feature vector satisfies an alert criterion associated with the operational feature.

17. The non-transitory computer-readable media of claim 16 wherein the operational feature is a correction feature of the computer application.

18. The non-transitory computer-readable media of claim 16 further comprising:
    receiving from the user an input specifying that the operational feature should be automatically executed without a prompt if the alert criterion is satisfied by a feature vector of a subsequently received media element;
    automatically executing the operational feature on the subsequently received media element without a prompt if the feature vector for the subsequently received media element satisfies the alert criterion.

19. The non-transitory computer-readable media of claim 16 wherein the prompting operation comprises:
    prompting the user about the operational feature of the computing application with reference to multiple original media elements simultaneously.

* * * * *